United States Patent
Surot

[19]

[11] Patent Number: 5,810,445

[45] Date of Patent: Sep. 22, 1998

[54] CHILD SEAT WITH MOVABLE ARMRESTS

[75] Inventor: Patrick Surot, Cholet, France

[73] Assignee: AmpaFrance S.A., Cholet, France

[21] Appl. No.: 883,766

[22] Filed: Jun. 27, 1997

[30] Foreign Application Priority Data

Jun. 28, 1996 [FR] France ..................... 96 98133

[51] Int. Cl.⁶ .......................................... A47C 7/54
[52] U.S. Cl. ........................ 297/411.37; 297/250.1; 297/284.9
[58] Field of Search ............. 297/452.33, 452.34, 297/250.1, 284.9, 284.1, 411.37, 216.11

[56] References Cited

U.S. PATENT DOCUMENTS

| | | |
|---|---|---|
| 4,636,000 | 1/1987 | Nishino . |
| 4,679,855 | 7/1987 | Hattori et al. . |
| 4,790,593 | 12/1988 | Davalos et al. . |
| 4,804,221 | 2/1989 | Saiki . |
| 5,092,654 | 3/1992 | Inaba et al. . |
| 5,098,157 | 3/1992 | Surot . |
| 5,328,236 | 7/1994 | Mizushima et al. . |
| 5,496,092 | 3/1996 | Williams et al. . |
| 5,645,317 | 7/1997 | Onishi et al. . |
| 5,681,083 | 10/1997 | Nelson et al. . |

FOREIGN PATENT DOCUMENTS

A-60-248446  12/1985  Japan .

*Primary Examiner*—Milton Nelson, Jr.
*Attorney, Agent, or Firm*—Pennie&Edmonds LLP

[57] ABSTRACT

Child seat of the type comprising a bucket 2 equipped with a sitting part and with a back part and intended to be placed on and fastened to an automobile seat 4, characterized in that two lateral frame elements 40 are mounted respectively on either side of the bucket 2 on upper 41 and lower 42 axles integral with the bucket 2 and arranged in a vertical plane, so as to define two armrest reinforcements pivoting between a position in which they are moved close to one another and a position in which they are moved away from one another, the pivoting of the two lateral frame elements being controlled simultaneously by a single control member 52 mounted on the front 5a of the sitting part 5.

7 Claims, 4 Drawing Sheets

CHILD SEAT WITH MOVABLE ARMRESTS

TECHNICAL FIELD

This invention relates to a child seat to be placed on and fastened to an automobile seat. More particularly, the invention relates to a child seat comprising a bucket, equipped with a sitting part, a back part, and lateral parts, wherein the lateral parts are mounted on either side of the bucket and pivot so as to increase or decrease the width of the child seat.

SUMMARY OF THE INVENTION

The subject of the present invention is a child seat comprising a bucket equipped with a sitting part, with a back part and with lateral parts and intended to be placed on and fastened to an automobile seat.

It is known that child seats intended for automobiles are designed to ensure maximum protection in the event of an accident, this being achieved under the best possible conditions of comfort.

French patent application no. 2,647,727 (AMPAFRANCE) has already described a child seat comprising lateral frame elements articulated relative to the main frame elements defining the seat and the back, so as to be capable of modifying the width of the bucket.

The object of the present invention is to make it easier to control the simultaneous movement of the lateral frame elements in order to allow a simple modification of the width of the bucket.

According to the invention, the child seat comprises a bucket equipped with a sitting part and with a back part and intended to be placed on and fastened to an automobile seat. Two lateral frame elements are mounted respectively on either side of the bucket on upper and lower axles integral with the bucket and arranged in a vertical plane. The two lateral frame elements define two armrest reinforcements pivoting between a position in which they are moved close to one another and a position in which they are moved away from one another. The pivoting of the two lateral frame elements is controlled simultaneously by means of a single control member mounted on the front of the sitting part.

This control member advantageously comprises a screw mounted, for the purpose of. its rotation, in a bearing integral with an inclined portion of the front of the sitting part. The screw acts, for example, on a rotary plate connected to two control rods, themselves connected to the two lateral frame elements.

DESCRIPTION OF THE DRAWINGS

The invention will be better understood by studying a particular embodiment described by way of non-limiting example and illustrated by the accompanying figures in which.

DESCRIPTION OF THE PREFERRED EMBODIMENTS

Figure 1:
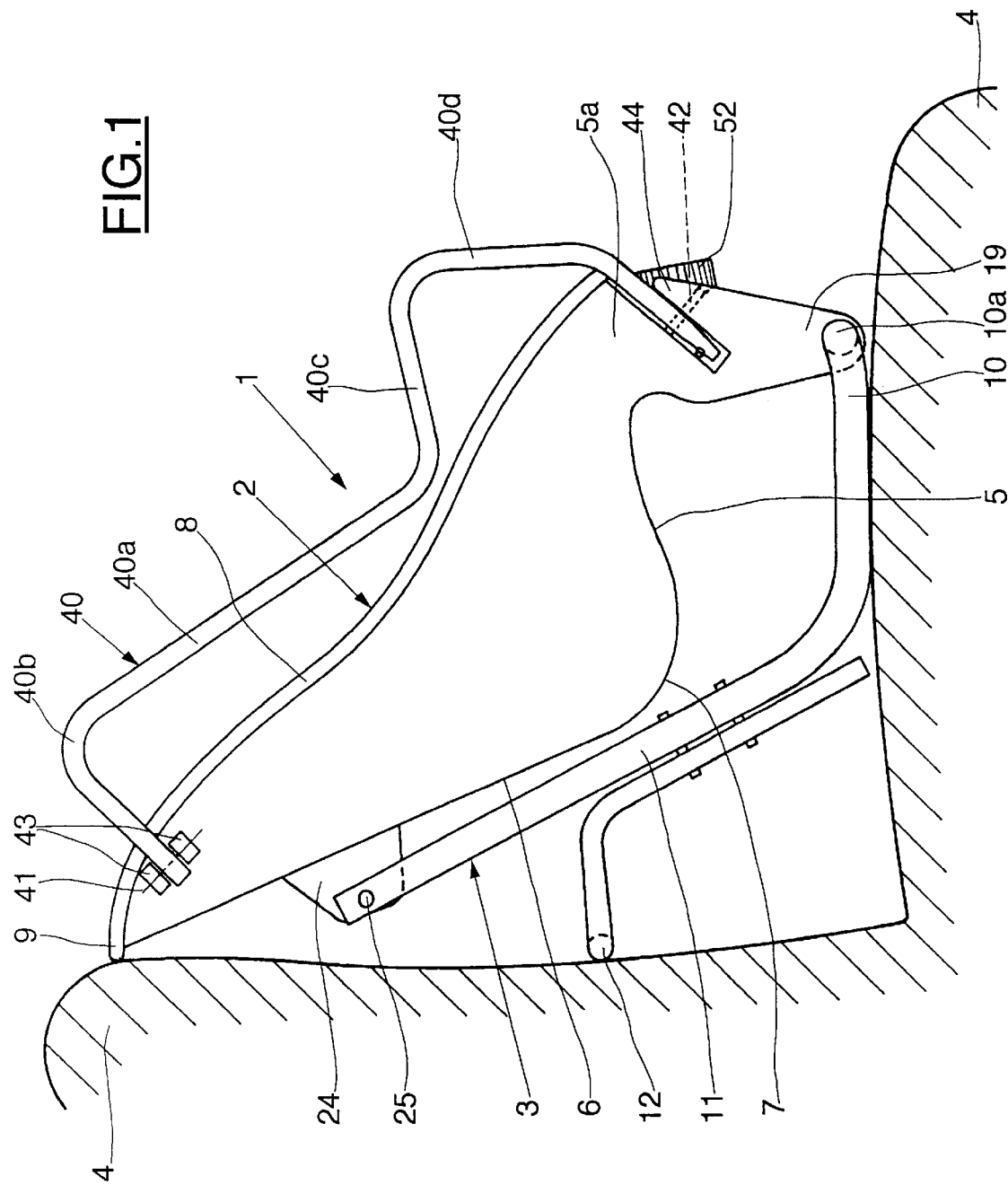
FIG. 1 is a side elevation view of the skeleton of a child seat according to the present invention.

As illustrated in the figures, the child seat designated as a whole by 1 comprises a part molded from plastic and forming a bucket 2, and a base, produced here in the form of a tubular metal reinforcement 3 supporting the bucket 2 and constituting a support intended to be placed on and fastened to the vehicle seat 4 illustrated diagrammatically. The child seat 1 is secured to the vehicle seat 4 in the conventional way, not illustrated in the drawings, by means of straps or preferably directly by the expedient of the automobile safety belt which cooperates with the reinforcement 3 for the purpose of this fastening.

Figure 2:
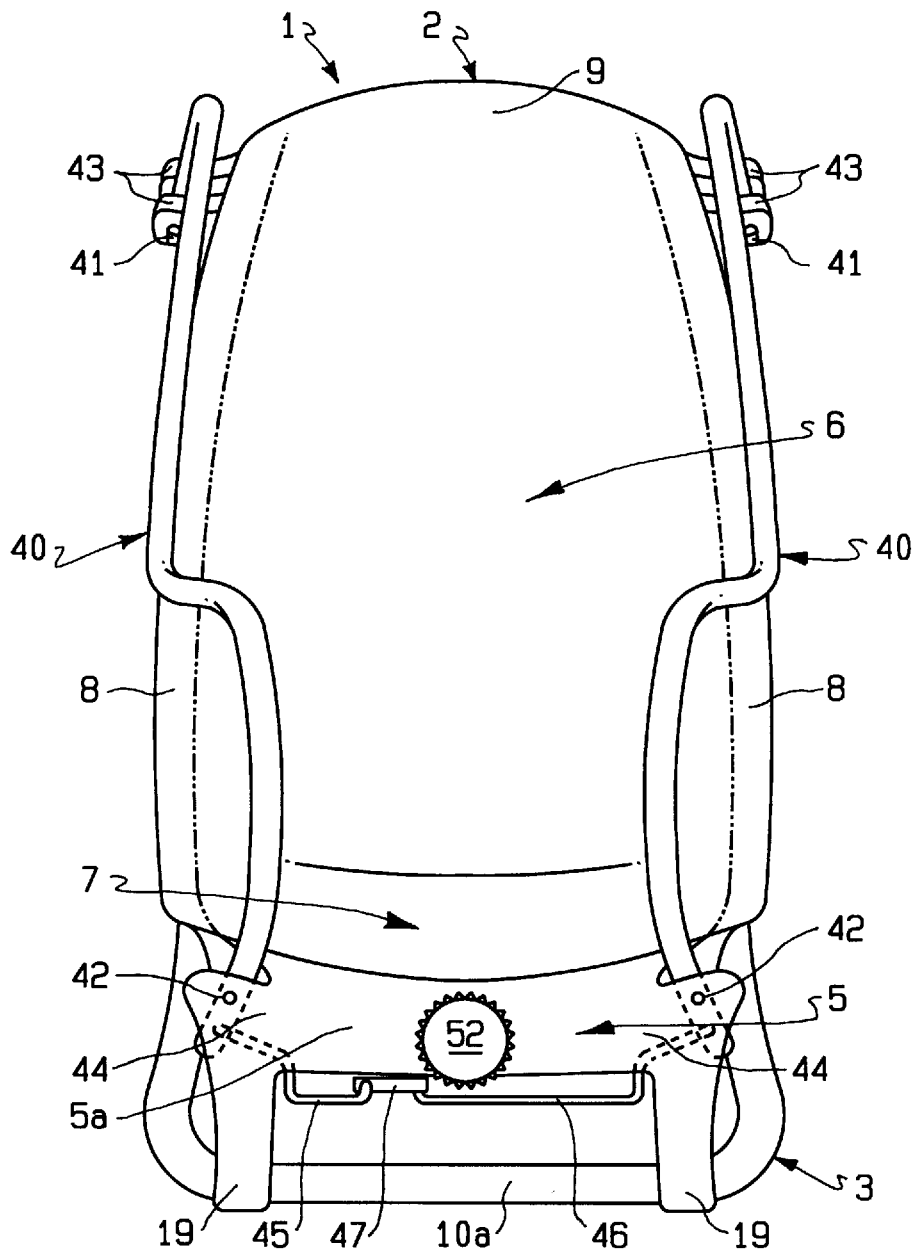
FIG. 2 is a front view of the seat skeleton of FIG. 1, showing the lateral armrests in the position in which they are closet to one another.
Figure 3:
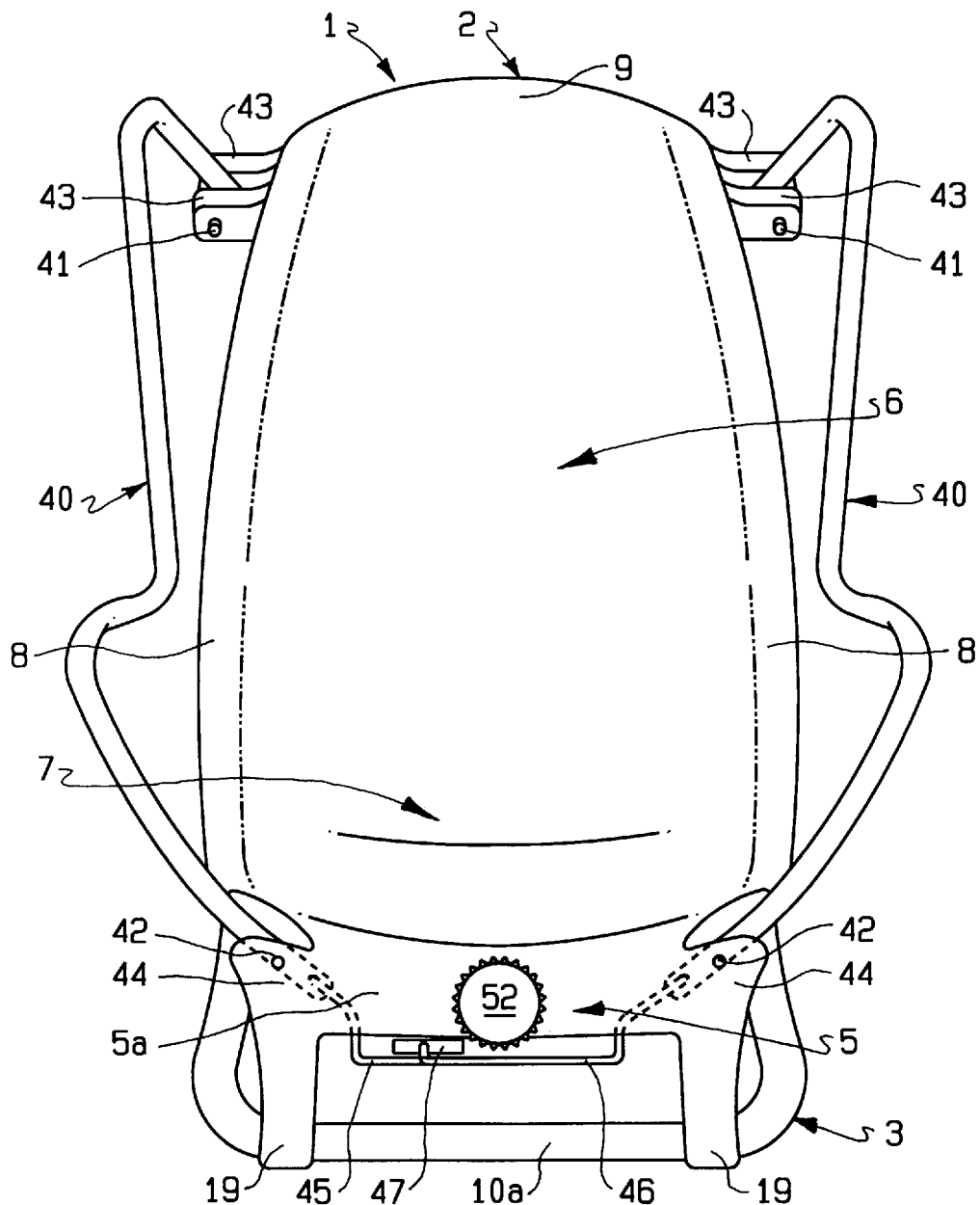
FIG. 3 a view similar to that of FIG. 2, showing the lateral armrests in the position in which they are furthest away from one another.

The bucket 2 comprises a substantially horizontal sitting part 5 (FIGS. 2 and 3) and a substantially vertical back part 6, although the latter has a slight rearward inclination in order to improve the child's comfort. The sitting part 5 and the back part 6 are joined to one another by means of a curved lower portion 7. The bucket 2 is completed by lateral portions 8 which extend from the upper part 9 of the bucket 2, said upper part performing the function of a headrest, to its lower part, where it meets the front part 5a of the sitting part, said front part performing the function of a support for the child's legs or feet. As may be seen in the figures, the assembly thus formed has the general 5 shape of a bucket, thereby ensuring the child's comfort.

The bucket made of molded plastic is, of course, lined with suitable upholstery which is not illustrated in the figures.

The tubular reinforcement 3 comprises a lower 10 framework 10 arranged under the sitting portion 5 and intended to be placed on the automobile seat 4. The lower framework 10 is extended upward in the form of a rear framework 11 which, moreover, receives a transverse spacing bar 12 having a U-shaped design and integral with s15 the rear framework 11. The whole of the tubular reinforcement 3 thus formed may be placed on the vehicle seat, the spacing bar 12 coming to bear on the back of the seat 4. The child seat 1 is then suitably installed on the vehicle seat 4, the bucket 2 being supported by the rigid reinforcement 3.

The bucket 2 made of molded plastic is fixed to the reinforcement 3 both in its lower part and in its upper part. For this purpose, the front part 5a has two protuberances 19 directed downward and gripping the crossmember 10a of the lower framework 10. In the same way, the back part 6 of the bucket 2 has in its upper portion, and on each side, a lug projecting rearward, designated by 24, molded integrally with the bucket 2 and gripping a crossmember 25 of the reinforcement 3. According to the present invention, the child seat 1 has armrests of variable spacing, making it possible, as desired, to modify the effective width of the bucket 2.

For this purpose, as illustrated in the figures, the child seat 1 comprises a lateral frame element 40 on each side of the bucket 2. Each element 40 consists, in the example illustrated, of a metal tube, the upper end of which is mounted rotatably on an upper axle 41 and the lower end of which is mounted rotatably on a lower axle 42. The lower 42 and upper 41 axles are fastened to the bucket 2 made of molded plastic and, moreover, are arranged in a vertical plane, as seen, for example, in FIGS. 2 and 3. It will be noted that, in the example illustrated, the upper axles 41 are mounted on fastening lugs 43 molded integrally with the bucket 2. The same applies to the lower axles 42 mounted on fastening lugs 44 molded integrally with the bucket 2 in the vicinity of the front part 5a of the sitting part 5 and in the extension of the protuberances 19.

In the example illustrated, each lateral frame element 40 has an upper portion 40a equipped with a bend 40b which makes it possible to ensure that the child's head is well protected. Each lateral frame element 40 comprises, furthermore, a lower portion 40c which is close to the horizontal and which is continued in a substantially vertical bend 40d, the assembly as a whole performing the function of an armrest. Any other suitable shape could be adopted.

It will, of course, be appreciated that, in actual fact, suitable upholstery lines each of the lateral frame elements 40, thus forming, on each side of the bucket 2, lateral members which improve the protection and comfort of the child.

Figure 4:
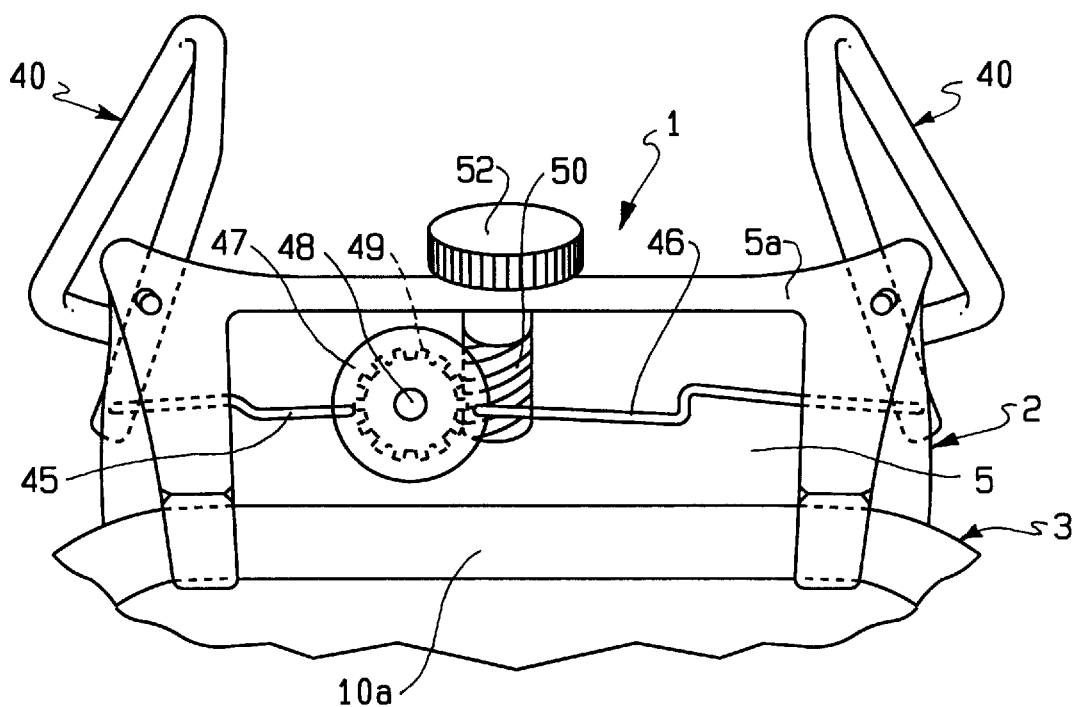
FIG. 4 is a partial bottom view showing the mechanism for controlling the lateral armrests.

According to the invention, the two lateral frame elements 40 can be moved away from one another to a greater or lesser extent. They pivot simultaneously by means of two control rods 45 and 46 connected at one of their ends to the respective lower ends of the lateral frame elements 40 and at their other end to a rotary plate 47. The control rods 45 and 46 are fastened to the rotary plate 47 at substantially diametrically opposite points, as may be seen in FIG. 4.

Figure 5:
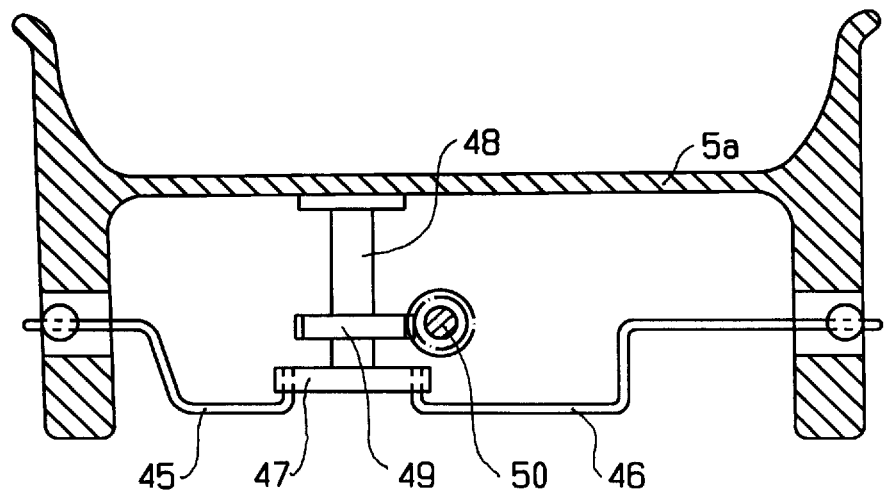
FIG. 5 is a detailed sectional view of the mechanism for controlling the armrests.

The plate 47 is mounted on a substantially vertical axle 48 (FIG. 5) integral with the front 5a of the sitting part 5. The rotation of the plate 47 is caused by a pinion 49, likewise mounted on the axle 48 and meshing with a screw 50 mounted, for the purpose of its rotation, in a bearing integral with the front part 5a of the sitting part 5. The screw 50 passes through the front part 5a and comprises, at its end, a drive wheel 52 arranged outside the front part 5a of the sitting part 5, in such a way as to enable the user to drive the screw 50 and consequently the rotary plate 47 manually in rotation, thus causing the two lateral frame elements to move away from or closer to one another. In the example illustrated, the screw 50 and the wheel 52 are arranged in the vertical plane of symmetry of the seat 1. It will be noted, by looking at FIG. 5, that, due to the means for driving in rotation which have just been described and, in particular, due to the axial arrangement of the screw 50 and of the drive wheel 52, the rotary plate 47 and the axle 48 are offset relative to the vertical plane of symmetry of the seat 1 as a whole. The result of this is that the control rod 45 is shorter than the control rod 46.

By virtue of the structure which has just been described, the seat according to the invention can easily be adapted to the child, for example according to its build or its age. Arranging the drive wheel in the axis of the seat and of the front part of the sitting part gives easier access to the means for controlling the armrests.

I claim:

1. A child seat to be used in an automotive vehicle comprising a bucket shaped element having a sitting part with a front portion, upper and lower faces and a back parts a base member adapted to be placed on and fastened to an automobile seat and two lateral frame elements pivotally mounted on either side of bucket shaded element on upper and lower axles integral with said bucket shaped element and arranged in a vertical plane, so as to define two armrests capable of moving from a first position where they are away from each other to a second position where they are close to each other and a rotary control member for simultaneously pivoting of said two lateral frame elements, said rotary control member being mounted on said front portion of said sitting part: said rotary control member driving a screw member causing rotation of a plate member connected to two control rods themselves connected to the two lateral frame elements.

2. The child seat according to claim 1, wherein each lateral frame element has an upper portion protecting a child's head and a lower portion which is almost horizontal and functions as an armrest.

3. The child seat according to claim 1, wherein a screw passes through the front portion of the sitting part.

4. The child seat according to claim 3, wherein the control rods are connected to lower ends of the two lateral frame elements.

5. The child seat according to any one of claims 3 to 4, wherein the screw and the rotary control member are arranged in a vertical plane of symmetry of the child seat.

6. The child seat according to claim 5, wherein the rotary plate is mounted on an axle offset relative to the vertical plane of symmetry of the child seat, the control rods being of different length.

7. A child seat to be used in an automotive vehicle comprising a bucket shaped element having a sitting part with a front portion, upper and lower faces and a back part, a base member adapted to be placed on and fastened to an automobile seat and two lateral frame elements pivotally mounted on either side of said bucket shaped element on upper and lower axles integral with said bucket shaped element and arranged in a vertical plane, so as to define two armrests capable of moving from a first position where they are away from each other to a second position where they are close to each other and a rotary control member for simultaneously pivoting of said two lateral frame elements, said rotary control member being mounted on said front portion of said sitting part; said rotary control member driving a screw member causing rotation of a plate member connected to two control rods themselves connected to the two lateral frame elements, said lateral frame elements each having an upper portion for protecting a h ead of a child, and a lower substantially horizontal portion for serving as an armrest.

* * * * *